(12) United States Patent
van Driel

(10) Patent No.: US 11,554,523 B2
(45) Date of Patent: Jan. 17, 2023

(54) PRESS PART FOR SUPPORTING A MOULD PART FOR ENCAPSULATING ELECTRONIC COMPONENTS MOUNTED ON A CARRIER AND A PRESS COMPRISING THE PRESS PART

(71) Applicant: Besi Netherlands B.V., Duiven (NL)

(72) Inventor: Albertus Franciscus Gerardus van Driel, Gendt (NL)

(73) Assignee: Besi Netherlands B.V., Duiven (NL)

( * ) Notice: Subject to any disclaimer, the term of this patent is extended or adjusted under 35 U.S.C. 154(b) by 106 days.

(21) Appl. No.: 16/756,178

(22) PCT Filed: Oct. 18, 2018

(86) PCT No.: PCT/NL2018/050684
§ 371 (c)(1),
(2) Date: Apr. 15, 2020

(87) PCT Pub. No.: WO2019/078716
PCT Pub. Date: Apr. 25, 2019

(65) Prior Publication Data
US 2021/0187803 A1    Jun. 24, 2021

(30) Foreign Application Priority Data

Oct. 20, 2017 (NL) .................................. 2019767

(51) Int. Cl.
*B29C 45/17* (2006.01)
*B29C 45/14* (2006.01)
*B29L 31/34* (2006.01)

(52) U.S. Cl.
CPC .... *B29C 45/1744* (2013.01); *B29C 45/14655* (2013.01); *B29L 2031/3406* (2013.01)

(58) Field of Classification Search
None
See application file for complete search history.

(56) References Cited

U.S. PATENT DOCUMENTS

2006/0177541 A1    8/2006   Kruidering
2006/0269653 A1 *  11/2006  Yoshioka ............ B29C 45/1761
                                                425/595

(Continued)

FOREIGN PATENT DOCUMENTS

JP     S61231724 A    10/1986
WO     03084731 A1    10/2003

*Primary Examiner* — Timothy Kennedy
*Assistant Examiner* — Olukorede Esan
(74) *Attorney, Agent, or Firm* — The Webb Law Firm

(57) ABSTRACT

The present invention relates to a press part (1,20,30,40) for supporting a mould part for encapsulating electronic components mounted on a carrier comprising a press block (2, 42), which press block comprises a contact surface (3), a side (4) facing away from the contact surface and at least one side wall (5) connecting the contact surface (3) and the side (4) facing away from the contact surface(3), wherein the press block (2, 42) comprises at least two opposed elements (6a, 6b, 21a, 21b, 31a, 31b, 31c, 31d, 44) protruding from the side wall (5), and wherein the side wall (5) transposes via only a recess (7) into each of the protruding elements (6a, 6b, 21a 21b, 31a 31b, 31c 31d 44). The present invention further relates to a press comprising the press part of the present invention.

18 Claims, 4 Drawing Sheets

(56) References Cited

U.S. PATENT DOCUMENTS

2007/0222124 A1* 9/2007 Tognon .............. B29C 45/1744
264/645
2010/0229622 A1 9/2010 Hansen
2016/0031138 A1* 2/2016 Murata .............. B29C 45/1744
425/451.9

* cited by examiner

PRESS PART FOR SUPPORTING A MOULD PART FOR ENCAPSULATING ELECTRONIC COMPONENTS MOUNTED ON A CARRIER AND A PRESS COMPRISING THE PRESS PART

CROSS-REFERENCE TO RELATED APPLICATIONS

This application is the United States national phase of International Application No. PCT/NL2018/050684 filed Oct. 18, 2018, and claims priority to The Netherlands Patent Application No. 2019767 filed Oct. 20, 2017, the disclosures of which are hereby incorporated by reference in their entirety.

BACKGROUND OF THE INVENTION

Field of the Invention

The present invention relates to a press part for supporting a mould part for encapsulating electronic components mounted on a carrier and a press comprising the press part of the present invention.

Description of Related Art

In encapsulating techniques, e.g. encapsulating a plurality of electronic components mounted on a carrier with a single continuous layer of encapsulating material, any deformation of the mould parts, e.g. deformation of one or more mould parts comprising a mould cavity defining the layer of encapsulating material and deformation of the mould part supporting the carrier, needs to be prevented in order to avoid the occurrence of flash and bleed of encapsulating material.

SUMMARY OF THE INVENTION

In order to provide an encapsulating device, e.g. a press, wherein the flatness of the mould parts is within a predefined tolerance zone, the present invention provides hereto a press part for supporting a mould part for encapsulating electronic components mounted on a carrier, comprising a press block, which press block comprises a contact surface, a side facing away from the contact surface and at least one side wall connecting the contact surface and the side facing away from the contact surface. The press block of the present invention comprises at least two opposed elements protruding from the side wall, wherein the side wall transposes via only a recess into each of the protruding elements. It was found that by providing a press part including the above defined press block configuration, a flatness tolerance zone of less than 10 µm can be obtained. Further optimisation of the configuration of the press block according to the present invention resulted in a flatness tolerance zone of less than 5 µm or even a flatness tolerance zone of less than 2 µm. Given the basic configuration of the press part of the present invention, a flatness tolerance zone of about 1.5 µm can be obtained.

The press block of the present invention may have a rectangular, cubic or cylindrical shape. In a preferred embodiment, the press block may comprise at least four side walls, wherein each of two opposed first and second side walls comprises at least one of the elements protruding from side wall. It was found that by providing a rectangular or cubic shaped press block comprising at least two protruding elements (kind of ear-like or arm-like press block parts) any deformation of the press block is absorbed by the at least two protruding elements resulting in a contact surface of the press block having a significant flatness. In order to provide elements having a maximum freedom of movement wherein deformation of the elements is not transmitted to any deformation of the contact surface of the press block, the side wall of the press block is provided with the recess situated between the protruding elements and the side wall surface the elements protrudes from.

It is noted that by increasing the number of protruding elements, the flatness tolerance can be lowered even further. Although the number of protruding elements is not limited, optimal results were obtained using a press block comprising four protruding elements, i.e. two elements protruding from each first and second side wall.

In an embodiment of the present invention, each of the protruding elements may comprise an upright side with respect to the contact surface of the press block, which upright side of each of the protruding elements connects to a third and/or fourth side wall of the press block. In such embodiment, the surface of such third and/or fourth side wall is preferably T- or (+)-shaped. In such embodiment, the recess provided in the side wall the elements protrudes from may comprise a slit adjacent to the protruding element wherein the slit extends to the third and/or fourth side wall.

In another embodiment of the present invention, e.g. in addition to the above embodiment or in an alternative embodiment, each of the protruding elements may comprises a side facing away from the contact surface of the press block, which side connects to the side of the press block facing away from the contact surface. In such embodiment, the front view of such press block (either cylindrical or rectangular/cubic shaped) is preferably T-shaped (wherein for the rectangular/cubic shaped press block the front is defined by the side view of either the third or fourth side wall of the press block). In such embodiment, the recess provided in the side wall the elements protrudes from may comprise a slit adjacent to the protruding element wherein the slit extends to the side of the press block facing away from the contact surface of the press block.

In a further embodiment, the present invention relates to a press part wherein the recess comprises a closed slit adjacent to and enclosing the protruding element. In such embodiment, the front view of such press block (either cylindrical or rectangular/cubic shaped) is (+)-shaped (wherein for the rectangular/cubic shaped press block the front is defined by the side view of either the third or fourth side wall of the press block).

In a preferred embodiment of the present invention, the recess comprises a first slit adjacent to a side of each of the protruding elements facing the contact surface and a second slit adjacent to the upright side of each of the protruding elements. It was found that by providing a second slit with a depth which is greater than the depth of the first slit, the flatness tolerance was further improved. It is noted that the depth of each slit is measured from the side wall the elements protrudes from.

Further, each of the protruding elements comprises a side facing the contact surface of the press block. Preferably, the side of each of the protruding elements facing the contact surface of the press block is situated at a distance from the contact surface of the press block. The most optimal distance between the side of the protruding element concerned and the contact surface of the press block may vary depending on the dimensions of the press block and the dimensions of the protruding element that the side concerned forms part of. For example in case a press block is used having a contact surface of 400 millimetre by 400 millimetre, the distance from the side concerned and the contact surface of the press block is at least 30% of the total height of the press block. It was found that by providing a press block wherein the distance concerned is at least 30% of the total height of the press block, deformation of the protruding elements does not negatively influence the flatness of the contact surface of the press block. Optimal results are obtained by selecting a distance of at least 40% or 50% of the total height of the press block. Most optimal results have been obtained using a distance within the range of 60 and 75% of the total height of the press block.

Furthermore, the dimensions of the recess provided in the side wall an element protrudes from may also be varied in order to arrive at the most optimal press part. The optimal dimensions of the recess partly not only depends on the dimensions of the protruding element, also the dimensions of the press block contributes significantly in arriving at the most optimal flatness tolerance of the contact surface. For example, for a press block having a contact surface of 400 millimetre by 400 millimetre, the width of the recess is preferably in the range of 60 to 100 millimetre, preferably within the range of 65 to 80 millimetre. Also, the depth of the recess may vary, but is preferably at least 60 millimetre, preferably in the range of 65 to 100 millimetre. It is noted that the width of the recess is defined by the distance between the protruding element and the recess connected surface of the side wall the element protrudes from. Again, as already defined above, the depth is measured from the side wall the element protrudes from. Without wishing to be bound to any particular theory, it is believed that by providing a press block comprising a recess adjacent to the protruding elements, the pressure applied to the protruding elements during use in a press is transferred more close to the centre of the press block. By transferring the pressure applied to the protruding part to the centre of the press block the forces applied to the contact surface of the press block are more uniformly applied resulting in a significant more flat contact surface.

It is noted that the above defined dimensions of the width and depth of the recess are based on a press block having a rectangular contact surface of 400 millimetre by 400 millimetre. It is further noted that the above defined dimensions are also applicable for a press block having a cylindrical shape with a diameter of 400 millimetre. A press block having the above mentioned dimensions is referred herein as a 400 millimetre press block (irrespective its rectangular or cylindrical shape). In case a press block is used having different dimensions, such as a press block having a contact surface of 200 millimetre by 200 millimetre (or having a diameter of 200 millimetre), such press block can be represented by the number 200, i.e. a 200 millimetre press block. A 500 millimetre press block relates to a press block having a rectangular contact surface of 500 millimetre by 500 millimetre (or a circular contact surface having a diameter of 500 millimetre). In order to provide a press block having preferred recess dimensions adapted to the dimensions of the press block itself, the preferred dimensions of the width and depth defined above should be scaled using the following formula:

$$A*(B/400),$$

wherein:
A is the defined width/depth of the recess for the 400 millimetre press block; and
B is the number representing the dimensions of the press block used.

Given the above, in case a 200 millimetre press block is used, the width of the recess is preferably in the range of 30 (60*[200/400]) to 50 (100*[200/400]) millimetre. Also, the preferred depth of a recess provided in a 500 millimetre press block may be at least 75 millimetre (60*[500/400]).

The press part of the present invention is preferably symmetrical. The press part of the present invention is preferably formed by the same material, e.g. made of a solid block of steel. By providing a press part wherein the press block and the elements protruding from the press block are made of the same material, the forces applied to the press part are distributed in a better controllable and predictable manner. The press part is preferably formed by milling techniques.

Although the contact surface may have different geometric shapes, however, a rectangular contact surface shape is preferred. By providing a rectangular contact surface shaped press part, the forces applied to the press part are more uniformly distributed to the mould part supported by the press part.

In a further embodiment of the present invention, the press part may comprises a recess situated in the side of the press block facing away from the contact surface of the press block. In a preferred embodiment the centreline of the recess coincides with the centreline of the press part that runs through the contact surface perpendicularly. It was found that by providing such recess, the flatness of the contact surface of the press block can be further improved compared to a press block lacking such recess.

By varying the dimensions of the recess, the flatness of the contact surface of the press block can be even further improved. For example, the recess may comprise a cylindrical cavity. Although good results are already obtained by a recess comprising a through-opening through the press block, even better results (in terms of flatness tolerance) are obtained by a recess comprising an end surface situated at a distance from the contact surface of the press block. In such embodiment, the end surface is preferably situated in one plane with a side of each of each of the protruding elements facing the contact surface.

The present invention further relates to a press for encapsulating electronic components mounted on a carrier, comprising a first press part and a second press part situated above the first press part, wherein both press parts are displaceable relative to each other for supporting at least two cooperating mould parts and a drive system for driving the relative displacement of the press parts, wherein at least one of the press parts comprises the press part of the present invention as defined above and wherein the at least two protruding elements of such press part are connected to the drive system.

In an embodiment of the present invention, the second press part of the press may comprise the press part of the present invention. In such embodiment, the so called 'top block' is provided with the press part of the present invention. Alternatively, the first press part of the press may comprise the press part of the present invention. In such embodiment, the so called 'bottom block' is provided with the press part of the present invention. In a further alternative embodiment, both first and second press parts may comprise the press part of the present invention.

BRIEF DESCRIPTION OF THE DRAWINGS

The present invention will be further elucidated on the basis of the non-limitative exemplary embodiments shown in the following figures. Herein shows.

DESCRIPTION OF THE INVENTION

Figure 1:
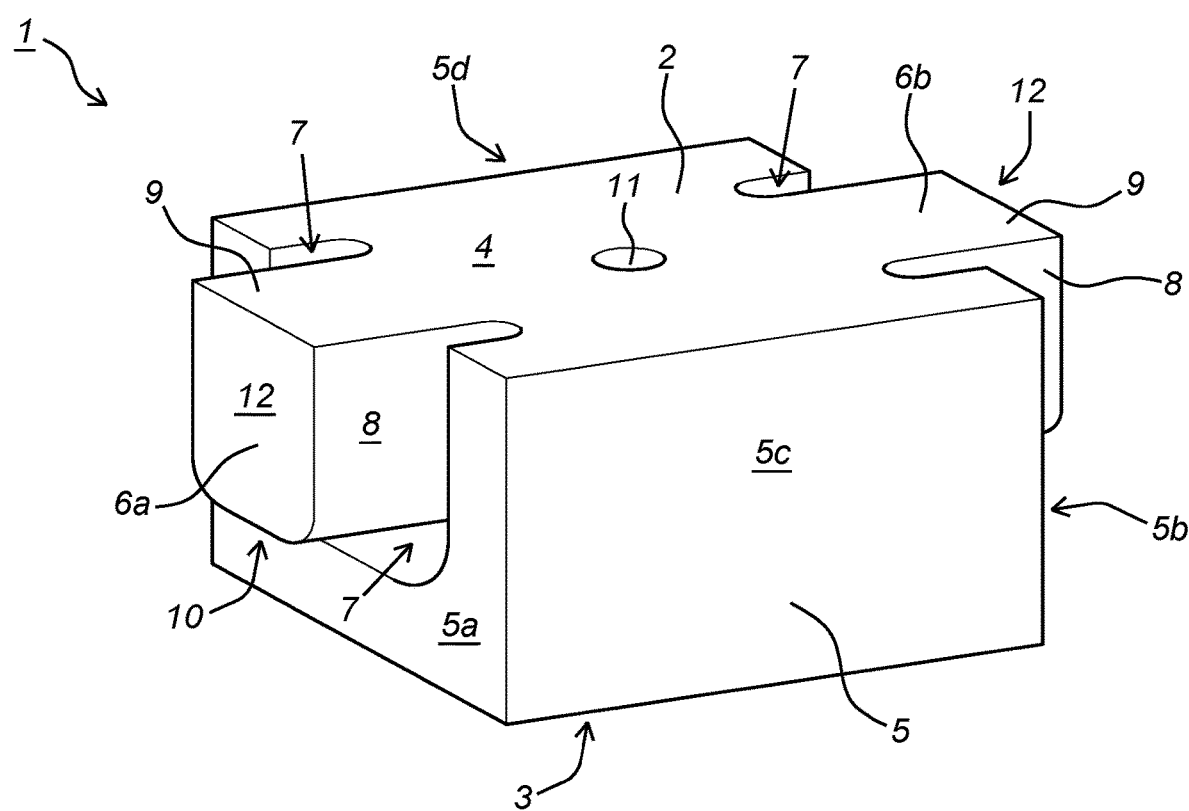
FIG. 1 a perspective view of the press part of the present invention.

FIG. 1 shows a perspective view of the press part 1 for supporting a mould part (not shown) for encapsulating electronic components mounted on a carrier. The press part 1 comprises a press block 2. The press block 2 comprises a contact surface 3, a side 4 facing away from the contact surface 3 and a side wall 5 connecting the contact surface 3 and the side 4 facing away from the contact surface 3. In FIG. 1, the side wall 5 consists of four side walls 5a, 5b, 5c, 5d. Side wall 5a is provided with an element 6a protruding from the side wall 5a. Furthermore, on the opposite side 5b of side wall 5a another element 6b protrudes from the side wall 5b. A recess 7 (e.g. a groove or slit) is situated adjacent to (and partially enclosing) both protruding elements 6a, 6b. The recess 7 extends to the side 4 of the press block 2 facing away from the contact surface 3. It is further noted that the top side 9 of both protruding elements 6a, 6b facing away from the contact surface 3 of the press block 2 connects to the side 4 of the press block 2 facing away from the contact surface 3.

In FIG. 1, the upright sides 8 (upright with respect to the contact surface 3) of both protruding elements 6a, 6b is situated at a distance from the front side wall 5c and rear side wall 5d of the press block 2. In an alternative embodiment, e.g. such as depicted in FIG. 2, the upright sides 22 of each protruding element 21a, 21b connect to the front side wall 5c and/or rear side wall 5d of the press block 2.

It is noted that the press part 1 depicted in FIG. 1 is a so called 'top block'. By connecting the protruding elements 6a, 6b to a drive system (not shown) and exerting a pressure on the protruding elements 6a, 6b in the direction of the contact surface 3 of the press block 2, the protruding elements 6a, 6b absorb any deformation due to the high pressure by bending in a direction towards the contact surface 3. By providing the recess 7 adjacent to the protruding element 6a, 6b and situating the side 10 of the protruding element 6a, 6b facing the contact surface 3 at a distance from the contact surface 3, the flatness of the contact surface 3 is guaranteed and kept at the lowest tolerance range possible.

In order to improve the flatness tolerance range even further, the press block 2 is provided with a recess 11. Recess 11 is depicted in FIG. 1 as a cylindrical cavity (e.g. a borehole). The recess 11 comprises an end surface (not shown) situated at a distance from the contact surface 3 and within the same plane of the side 10 of both elements 6a, 6b.

Figure 2:
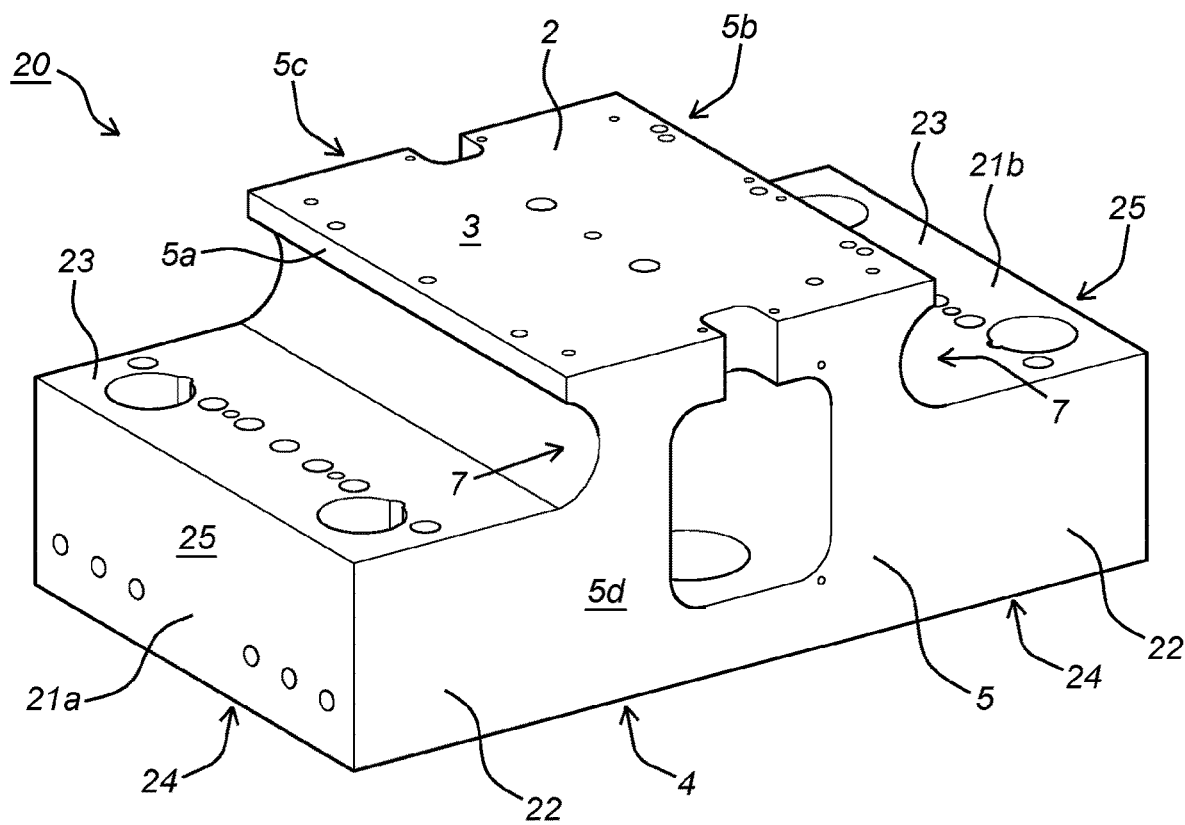
FIG. 2 a perspective view of an alternative press part of the present invention.

FIG. 2 shows a perspective view of an alternative press part 20 for supporting a mould part (not shown) for encapsulating electronic components. Press part 20 comprises a press block 2 including the contact surface 3, side 4 facing away from the contact surface 3 and a side wall 5 (in FIG. 2 consisting of four side walls 5a, 5b, 5c, 5d). The press part 20 further comprises two elements 21a, 21b protruding from side wall 5a and opposite side wall 5b. The protruding elements 21a, 21b comprise a side 23 facing the contact surface 3 of the press block 2 situated at a distance from the contact surface 3. Furthermore, the upright sides 22 (upright with respect to the contact surface 3) of the protruding elements 21a, 21b connect to the front side wall 5c and rear side wall 5d of the press block 2 resulting in a T-shaped front side wall 5c and rear side wall 5d surface. Inherently, the recess 7 adjacent to the protruding elements 21a, 21b extends to both the front side wall 5c and the rear side wall 5d.

Given the protruding elements 6a, 6b, 21a, 21b depicted in FIGS. 1 and 2, it is noted that the size of the protruding elements 6a, 6b, 21a, 21b, defined by the surface area of the end surface 12, 25 of the protruding elements 6a, 6b, 21a, 21b, is about 50% of the total surface of the end surface 12, 25, the recess 7 and the side wall 5a, 5b the element 6a, 6b, 21a, 21b protrudes from together.

Figure 3:
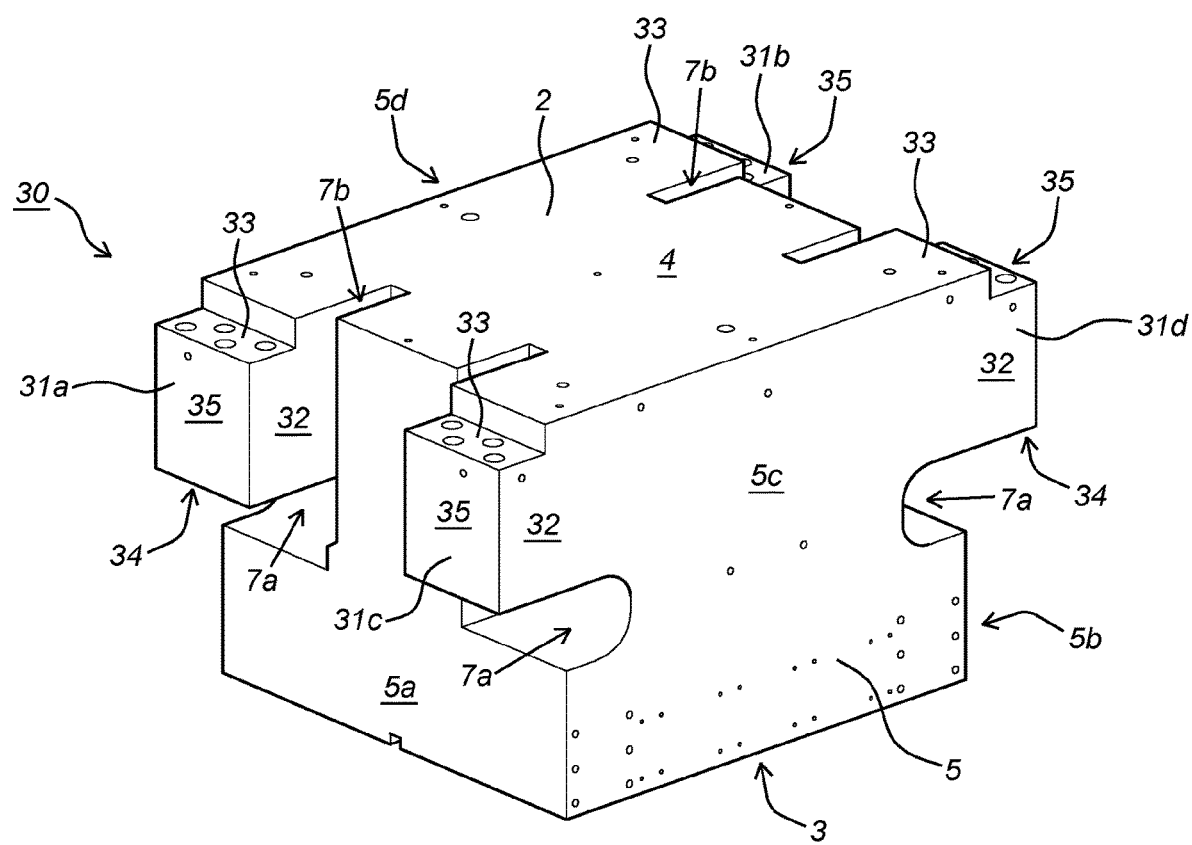
FIG. 3 a perspective view of another alternative press part of the present invention.

FIG. 3 shows a perspective view of a further alternative press part 30 comprising a press block 2 similar to the press block 2 depicted in FIG. 1, wherein the press block further comprises four, instead of two, protruding elements 31a, 31b, 31c, 31d. in each of the protruding elements 31a, 31b, 31c, 31d one of the upright sides 32 connects to the front side wall 5c or rear side wall 5d. The top side 33 of each of the protruding elements 31a, 31b, 31c, 31d facing away from the contact surface 3 of the press block 2 connects to the side 4 of the press block 2 facing away from the contact surface 3.

In FIG. 3, the recess 7 comprises a first groove 7a situated adjacent to the bottom side 34 of each of the protruding elements 31a, 31b, 31c, 31d and a second groove 7b situated adjacent to one of the upright sides 32 of each of the protruding elements 31a, 31b, 31c, 31d. Although not visible in FIG. 3, the depth of the second groove 7b is greater than the depth of the first groove 7a, wherein the depth of each groove 7a, 7b is measured from the side wall 5a, 5b of the press block 2.

Figure 4:
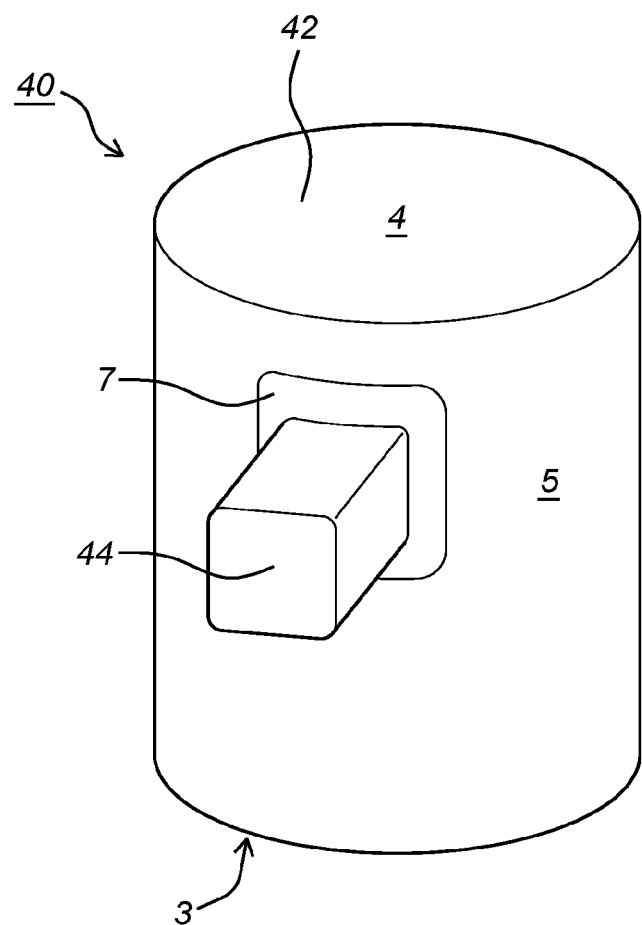
FIG. 4 a perspective view of a cylindrical press part of the present invention.

FIG. 4 shows a perspective view of a cylindrical press part 40 of the present invention. The cylindrical press block 42 comprises a contact surface 3, a side 4 facing away from the contact surface 3 and a side wall 5 connecting the contact surface 3 and the side 4 facing away from the contact surface 3. The press block 42 further comprises a first element 44 protruding from the side wall 5 and a second element (not visible) protruding from the side wall 5 opposite the first element 44. The protruding elements 44 are enclosed by a recess 7.

The invention claimed is:

1. A press part for supporting a mould part for encapsulating electronic components mounted on a carrier, comprising:
  a press block, which press block comprises a contact surface, a side facing away from the contact surface and at least one side wall connecting the contact surface and the side facing away from the contact surface,
  wherein the press block comprises at least two opposed elements protruding from the side wall,
  characterized in that a transition between the side wall and each of the protruding elements is formed by only a recess,
  wherein the press block comprises at least four side walls, wherein each of two opposed first and second side walls comprises at least one of the at least two opposed elements protruding from the side wall, and
  wherein:
    the recess comprises a slit adjacent to the protruding element, wherein the slit extends to the side of the press block facing away from the contact surface, or
    the recess comprises a closed slit adjacent to and enclosing the protruding element.

2. The press part according to claim 1, characterized in that with respect to the contact surface upright side of each of the at least two opposed elements protruding from the side wall connect to a third and/or fourth side wall.

3. The press part according to claim 1, characterized in that the recess comprises a slit adjacent to the protruding element, wherein the slit extends to the third and/or fourth side wall.

4. The press part according to claim 1, characterized in that a side of each of the protruding elements facing away from the contact surface connects to the side of the press block facing away from the contact surface.

5. The press part according to claim 1, characterized in that the recess comprises a first slit adjacent to a side of each of the protruding elements facing the contact surface and a second slit adjacent to the upright side of each of the protruding elements.

6. The press part according to claim 5, characterized in that the depth of the second slit is greater than the depth of the first slit, which depth of each slit is measured from the side wall the elements protrudes from.

7. The press part according to claim 1, characterized in that the side of each of the protruding elements facing the contact surface is situated at a distance from the contact surface.

8. The press part according to claim 7, characterized in that the distance from the side of each of the protruding elements facing the contact surface to the contact surface of the press block is at least 30% of the total height of the press block.

9. The press part according to claim 1, characterized in that a width of the recess is [60, 100] millimeters.

10. The press part according to claim 1, characterized in that a depth of the recess is at least 60 millimeters.

11. The press part according to claim 9, characterized in that the width and/or depth of the recess is scaled using the following formula:

$$A*(B/400),$$

wherein:
A is the width or the depth; and
B is a number representing the dimensions of the press block used.

12. The press part according to claim 1, characterized in that the press part is symmetrical.

13. The press part according to claim 1, characterized in that the side of the press block facing away from the contact surface comprises a recess, wherein the centreline of the recess coincides with the centreline of the press part that runs through the contact surface perpendicularly.

14. The press part according to claim 13, characterized in that the recess comprises a cylindrical cavity.

15. The press part according to claim 13, characterized in that the recess comprises a through-opening through the press block.

16. The press part according to claim 13, characterized in that the recess comprises an end surface at a distance from the contact surface.

17. The press part according to claim 16, characterized in that the end surface is situated in one plane with a side of each of the protruding elements facing the contact surface.

18. A press for encapsulating electronic components mounted on a carrier, comprising:
   a first press part and a second press part situated above the first press part, wherein both press parts are displaceable relative to each other for supporting at least two cooperating mould parts; and
   a drive system for driving the relative displacement of the press parts,
   characterized in that at least one of the press parts comprises the press part according to claim 1 and wherein the at least two protruding elements are connected to the drive system.

* * * * *